(12) United States Patent
Akada

(10) Patent No.: US 11,465,931 B2
(45) Date of Patent: Oct. 11, 2022

(54) ULTRAVIOLET LIGHT ABSORBING GLASS

(71) Applicant: AGC Inc., Chiyoda-ku (JP)

(72) Inventor: Shuichi Akada, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 682 days.

(21) Appl. No.: 16/444,727

(22) Filed: Jun. 18, 2019

(65) Prior Publication Data

US 2019/0389762 A1 Dec. 26, 2019

Related U.S. Application Data

(63) Continuation of application No. PCT/JP2017/045826, filed on Dec. 20, 2017.

(30) Foreign Application Priority Data

Dec. 21, 2016 (JP) .............................. JP2016-248104

(51) Int. Cl.
| | |
|---|---|
| *C03C 3/087* | (2006.01) |
| *C03C 3/095* | (2006.01) |
| *C03C 4/08* | (2006.01) |
| *C03C 4/02* | (2006.01) |

(52) U.S. Cl.
CPC .............. *C03C 3/095* (2013.01); *C03C 3/087* (2013.01); *C03C 4/02* (2013.01); *C03C 4/085* (2013.01); *C03C 2204/00* (2013.01)

(58) Field of Classification Search
CPC ........... C03C 3/087; C03C 3/097; C03C 4/02; C03C 4/08; C03C 4/085; C03C 2204/00
See application file for complete search history.

(56) References Cited

U.S. PATENT DOCUMENTS

| | | |
|---|---|---|
| 2016/0229735 A1 | 8/2016 | Akada |
| 2017/0174553 A1 | 6/2017 | Akada |
| 2017/0327409 A1 | 11/2017 | Seto |
| 2018/0319699 A1 | 11/2018 | Akada et al. |
| 2020/0017397 A1* | 1/2020 | Seto ................. C03C 3/087 |

FOREIGN PATENT DOCUMENTS

| | | | |
|---|---|---|---|
| CN | 108473364 A | 8/2018 | |
| EP | 3466897 | 4/2019 | |
| JP | 8-245238 | 9/1996 | |
| JP | 2000-247679 | 9/2000 | |
| JP | 2000247679 A | * 9/2000 | ............ C03C 3/078 |
| WO | WO2015/088026 | 6/2015 | |
| WO | WO2016/039251 | 3/2016 | |
| WO | WO2016/088374 | 6/2016 | |
| WO | WO 2017/126595 A1 | 7/2017 | |

OTHER PUBLICATIONS

International Search Report dated Mar. 27, 2018 in PCT/JP2017/045826 filed Dec. 20, 2017 (with English Translation).
Written Opinion dated Mar. 27, 2018 in PCT/JP2017/045826 filed Dec. 20, 2017.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

An ultraviolet light absorbing glass according to the present invention includes 1.6% or more of t-$Fe_2O_3$, more than 1.0% of $TiO_2$, and 0.016% or more of CoO. The ultraviolet light absorbing glass has t-$Fe_2O_3$/$TiO_2$ of 1.2 or more, and an ultraviolet light transmittance (TUV400) at a sheet thickness of 3.1 mm of 2.0% or less, a ratio of visible light transmittance (TVA)/TUV400 of 10 or more, and a dominant wavelength ($\lambda D$) of 555 nm or less.

19 Claims, No Drawings

ULTRAVIOLET LIGHT ABSORBING GLASS

TECHNICAL FIELD

The present invention relates to an ultraviolet absorbing glass that is suitable as dark gray-colored glass for vehicles (particularly for automobiles).

BACKGROUND ART

As rear-side glass and rear glass for automobiles, dark gray-colored glass having a significantly-reduced visible light transmittance (so-called dark gray glass or privacy glass) has been put into practical use. This privacy glass is excellent in indoor comfort and reduction of air-conditioning loads due to favorable sunlight shielding performance in a wide wavelength region from an ultraviolet region through an infrared region, and is excellent in terms of possible options of color tone imparting luxury feelings, excellent designability, in-vehicle privacy protection, and the like.

In recent years, an interest in ultraviolet countermeasures is increasing. To respond to this, privacy glass having a lower ultraviolet transmittance is required.

Patent Literature 1 discloses an ultraviolet absorbing glass suitable as privacy glass for vehicles, having an ultraviolet transmittance specified by ISO 9050:2003 at a sheet thickness of 3.5 mm being 2% or less.

In addition, Patent Literature 2 discloses an ultraviolet shielding glass sheet having an ultraviolet transmittance specified by ISO 9050:1990 at a thickness of 1 to 5 mm being 1.5% or less.

CITATION LIST

Patent Literature

Patent Literature 1: WO2015/088026 A1
Patent Literature 2: WO2016/088374 A1

SUMMARY OF INVENTION

Technical Problem

In recent years, privacy glass for a vehicle is required to have a significantly low ultraviolet transmittance. On the other hand, the privacy glass is required to have a visible light transmittance which is not too low to visually recognize an outside of the vehicle from an inside of the vehicle. Further, when a passenger sees a scenery through the glass, the passenger tends to like the color of light transmitted by the glass not to be yellowish. However, the background-art ultraviolet absorbing glass disclosed in Patent Literature 1 or 2 is high in the ultraviolet transmittance or low in not only the ultraviolet transmittance but also the visible light transmittance, or the light transmitted through the glass is yellowish.

To respond to the above problems, the present invention has an object to provide an ultraviolet absorbing glass which is suitable as a dark gray-colored glass for vehicles, which has a significantly low ultraviolet transmittance and a visible light transmittance not too low and the light transmitted through which is not yellowish.

Solution to Problem

In order to attain the foregoing object, an ultraviolet absorbing glass according to the present invention contains, as represented by mass % based on oxides:

| | |
|---|---|
| total iron (t-$Fe_2O_3$) in terms of $Fe_2O_3$ | 1.6% or more; |
| $TiO_2$ | more than 1.0%; and |
| CoO | 0.016% or more, | satisfying a value (t-$Fe_2O_3$/$TiO_2$) obtained by dividing a content of the total iron in terms of $Fe_2O_3$ by a content of $TiO_2$ being 1.2 or more, having an ultraviolet transmittance (TUV400) specified by ISO 13837:2008 convention A at a sheet thickness of 3.1 mm is 2.0% or less, satisfying a ratio (TVA/TUV400) of a visible light transmittance (TVA) based on a 2-degree field of view using a Standard Illuminant A to the TUV400 at a sheet thickness of 3.1 mm being 10 or more, and having a dominant wavelength ($\lambda$D) obtained based on a 2-degree field of view using a Standard Illuminant C at a sheet thickness of 3.1 mm is 555 nm or less.

Advantageous Effects of Invention

The ultraviolet absorbing glass according to the present invention attains a significantly low ultraviolet transmittance, has a visible transmittance not too low, and light transmitted through the glass is not yellowish.

DESCRIPTION OF EMBODIMENTS

An ultraviolet absorbing glass according to an embodiment of the present invention will be described below in detail.

Throughout the present description, TE designates an energy transmittance obtained based on JIS R3106:1998, TUV400 designates an ultraviolet transmittance obtained based on ISO 13837:2008 convention A, and TUV380 designates an ultraviolet transmittance obtained based on ISO 9050:2003. In addition, TVA designates a visible light transmittance obtained based on a 2-degree field of view using a Standard Illuminant A, XD designates a dominant wavelength obtained based on a 2-degree field of view using a Standard Illuminant C. and Pe designates excitation purity obtained based on a 2-degree field of view using a Standard Illuminant C.

An ultraviolet absorbing glass according to one embodiment of the present invention contains, as represented by mass % based on oxides:

| | |
|---|---|
| total iron (t-$Fe_2O_3$) in terms of $Fe_2O_3$ | 1.6% or more; |
| $TiO_2$ | more than 1.0%; and |
| CoO | 0.016% or more, | satisfying a value (t-$Fe_2O_3$/$TiO_2$) obtained by dividing a content of the total iron in terms of $Fe_2O_3$ by a content of $TiO_2$ being 1.2 or more, having an ultraviolet transmittance (TUV400) specified by ISO 13837:2008 convention A at a sheet thickness of 3.1 mm is 2.0% or less, satisfying a ratio (TVA/TUV400) of a visible light transmittance (TVA) based on a 2-degree field of view using a Standard Illuminant A to the TUV400 at a sheet thickness of 3.1 mm being 10 or more, and having a dominant wavelength ($\lambda$D) obtained based on a 2-degree field of view using a Standard Illuminant C at a sheet thickness of 3.1 mm is 555 nm or less.

The reasons for containing the above-described components in the present invention will be described below.

Unless particularly otherwise indicated, % means mass %. In addition, the word "content" means a numerical value represented by mass %.

Total iron in terms of $Fe_2O_3$ (that is, total iron including FeO being an oxide of divalent iron, and $Fe_2O_3$ being an oxide of trivalent iron, and the total iron in terms of $Fe_2O_3$ will be also referred to as $t\text{-}Fe_2O_3$) is an essential component, which serves as a component decreasing ultraviolet transmittances (TUV380 and TUV400). The $t\text{-}Fe_2O_3$ content is 1.6% or more, preferably 1.7% or more, more preferably 1.8% or more, more preferably 1.9% or more, more preferably 2.0% or more, more preferably 2.1% or more, more preferably 2.2% or more, more preferably 2.3% or more, more preferably 2.4% or more, more preferably 2.5% or more, even more preferably 2.6% or more, especially preferably 2.7% or more, and most preferably 2.8% or more.

On the other hand, in order to prevent TVA from being too low, the $t\text{-}Fe_2O_3$ content is preferably 6.0% or less. When the $t\text{-}Fe_2O_3$ content is 6.0% or less, thermal efficiency can be prevented from deteriorating during melting, so that a molten glass can be prevented from staying in a bottom portion of a melting furnace which is far from a heating source. Thus, meltability is fine. The $t\text{-}Fe_2O_3$ content is more preferably 5.0% or less, more preferably 4.5% or less, more preferably 4.0% or less, more preferably 3.5% or less, even more preferably 3.0% or less, and especially preferably 2.9% or less.

$TiO_2$ is an essential component, which serves as a component decreasing ultraviolet transmittances (TUV380 and TUV400). In addition, $TiO_2$ has an effect of decreasing viscosity of a molten glass during melting and makes it difficult for the molten glass to stay. When the $TiO_2$ content exceeds 1.0, the ultraviolet transmittances can be decreased. The $TiO_2$ content is preferably 1.2% or more, more preferably 1.4% or more, more preferably 1.6% or more, even more preferably 1.7% or more, and especially preferably 1.8% or more.

On the other hand, in order to prevent a visible light transmittance from being too low, the $TiO_2$ content is preferably 5% or less. The $TiO_2$ content is more preferably 4.0% or less, further preferably 3.0% or less, further more preferably 2.5% or less, even more preferably 2.0% or less, and especially preferably 1.9% or less.

CoO is an essential component, which serves as a component alleging glass to be tinged with blue and reducing excitation purity. When the CoO content is 0.016% or more, the color of the glass is prevented from being tinged with yellow. The CoO content is preferably 0.018% or more, more preferably 0.02% or more, more preferably 0.025% or more, even more preferably 0.030% or more, and especially preferably 0.033% or more.

On the other hand, in order to prevent the color of the glass from being excessively tinged with blue, the CoO content is preferably 0.045% or less, more preferably 0.04% or less, even more preferably 0.038% or less and especially preferably 0.036% or less.

In the ultraviolet absorbing glass of the present invention, a ratio obtained by dividing the $t\text{-}Fe_2O_3$ content by the $TiO_2$ content (hereinafter also referred to as $t\text{-}Fe_2O_3/TiO_2$) is 1.2 or more. When $t\text{-}Fe_2O_3/TiO_2$ is 1.2 or more, it is possible to decrease ultraviolet transmittances (TUV380 and TUV400) without making TVA too low. $t\text{-}Fe_2O_3/TiO_2$ is more preferably 1.3 or more, even more preferably 1.4 or more, and especially preferably 1.5 or more.

On the other hand, $t\text{-}Fe_2O_3/TiO_2$ is preferably 3.0 or less. When $t\text{-}Fe_2O_3/TiO_2$ is 3.0 or less, it is possible to reduce the ultraviolet transmittances (TUV380 and TUV400) without making TVA too high. $t\text{-}Fe_2O_3/TiO_2$ is more preferably 2.5 or less, further preferably 2.3 or less, further more preferably 2.2 or less, even preferably 2.0 or less, even more preferably 1.8 or less, and especially preferably 1.6 or less.

In the ultraviolet absorbing glass of the present invention, a product of the content of FeO which is an oxide of divalent iron and the $TiO_2$ content (hereinafter also referred to as $FeO \times TiO_2$) is 0.1 or more and less than 1.1. Due to coexistence of FeO and $TiO_2$, it is possible to obtain ultraviolet absorbing performance caused by the interaction of FeO and $TiO_2$, which exceeds the sum of ultraviolet absorbing performance obtained by FeO and ultraviolet absorbing performance obtained by $TiO_2$.

When $FeO \times TiO_2$ is 0.1 or more, the ultraviolet absorbing performance caused by the interaction of FeO and $TiO_2$ is so large that the ultraviolet transmittances (TUV380 and TUV400) can be made lower. In addition, TVA can be decreased, and TE can be also decreased. $FeO \times TiO_2$ is more preferably 0.3 or more, more preferably 0.5 or more, more preferably 0.6 or more, more preferably 0.7 or more, even more preferably 0.8 or more, and especially preferably 0.9 or more.

On the other hand, when $FeO \times TiO_2$ is less than 1.1, TVA can be prevented from being too low. $FeO \times TiO_2$ is more preferably 1.05 or less, even more preferably 1.0 or less, and especially preferably 0.95 or less.

The ultraviolet absorbing glass of the present invention contains, as represented by mass % based on oxides:

| | |
|---|---|
| $SiO_2$ | 62 to 75%; |
| $Al_2O_3$ | 0 to 5%; |
| MgO | 0 to 6%; |
| CaO | 5 to 15%; |
| $Na_2O$ | 10 to 20%; and |
| $K_2O$ | 0 to 5% |

The above-described "to" each indicating a numerical range is used to mean that numerical values described before and after the "to" are included as the lower limit and the upper limit of the range, and hereinafter in the present description, unless particularly otherwise indicated, "to" will be used in the same manner.

$SiO_2$ is a component forming a network of the glass. When the $SiO_2$ content is 62% or more, weathering resistance of the glass is excellent. The $SiO_2$ content is more preferably 65% or more, and even more preferably 67% or more.

On the other hand, when the $SiO_2$ content is 75% or less, viscosity of the glass can be prevented from being too high, and the meltability of the glass is excellent. The $SiO_2$ content is more preferably 72% or less, and even more preferably 70% or less.

$Al_2O_3$ is a component improving weathering resistance of the glass. When the $Al_2O_3$ content is 5% or less, viscosity of the glass can be prevented from being too high, and the meltability of the glass is excellent. The $Al_2O_3$ content is more preferably 4% or less, and even more preferably 3% or less.

In the case where $Al_2O_3$ is contained, the $Al_2O_3$ content is preferably 0.5% or more, and more preferably 1% or less.

MgO is a component accelerating the melting of raw materials and improving weathering resistance. When the MgO content is 6% or less, devitrification is less likely to occur. The MgO content is more preferably 5% or less, and even more preferably 4.6% or less.

In the case where MgO is contained, the MgO content is preferably 1% or more, more preferably 2% or more and even more preferably 3% or more.

CaO is a component accelerating the melting of raw materials and improving weathering resistance. When the CaO content is 5% or more, the melting of raw materials is accelerated easily. In addition, the weathering resistance of the glass is excellent. The CaO content is more preferably 6% or more, and even more preferably 7% or more.

On the other hand, when the CaO content is 15% or less, devitrification is less likely to occur. The CaO content is more preferably 13% or less and even more preferably 11% or less.

$Na_2O$ is a component accelerating the melting of raw materials. When the $Na_2O$ content is 10% or more, the melting of raw materials is accelerated. Thus, the meltability is excellent. The $Na_2O$ content is more preferably 11% or more and even more preferably 12% or more.

On the other hand, when the $Na_2O$ content is 20% or less, the glass has excellent weathering resistance. The $Na_2O$ content is more preferably 18% or less and even more preferably 16% or less.

$K_2O$ is a component accelerating the melting of raw materials. When the $K_2O$ content is 5% or less, damage on refractories of a melting furnace due to volatilization is reduced. The $K_2O$ content is more preferably 4% or less, and even more preferably 3% or less.

In the case where $K_2O$ is contained, the $K_2O$ content is preferably 0.1% or more and more preferably 0.3% or more.

In the ultraviolet absorbing glass of the present invention, the FeO content is preferably 0.1 to 0.9%. FeO is a component absorbing thermal energy. When the FeO content is 0.1% or more, TE is sufficiently low. The FeO content is more preferably 0.20% or more, more preferably 0.25% or more, more preferably 0.3% or more, more preferably 0.35% or more, more preferably 0.4% or more, even more preferably 0.45% or more and especially preferably 0.5% or more.

On the other hand, when the FeO content is 0.9% or less, thermal efficiency during melting is not deteriorated, and a molten glass is prevented from staying in a bottom portion of a melting furnace which is far from a heating source. The FeO content is more preferably 0.7% or less, more preferably 0.65% or less, even more preferably 0.6% or less and especially preferably 0.55% or less.

In the ultraviolet absorbing glass of the present invention, the Se content is preferably 0 to 0.01%. Se is a content adjusting the color of the glass and reducing the excitation purity Pe. When the Se content is 0.01% or less, the glass can be further prevented from being tinged with yellow. In addition, an influence that the glass is tinged with red is small. The Se content is more preferably 0.005% or less, more preferably 0.002% or less, even more preferably 0.001% or less, especially preferably 0.0008% or less and most preferably 0.0005% or less.

In the case where Se is contained, the Se content is preferably 0.0001% or more, more preferably 0.0002% or more, even more preferably 0.0003% or more and especially preferably 0.0004% or more.

In the ultraviolet absorbing glass of the present invention, the $CeO_2$ content is preferably 0 to 1.0%. $CeO_2$ is a component decreasing the ultraviolet transmittances (TUV380 and TUV400). The raw material cost of $CeO_2$ is high. When the $CeO_2$ content is 1.0% or less, the raw material cost can be reduced. The $CeO_2$ content is more preferably 0.5% or less, more preferably 0.3% or less, even more preferably 0.2% or less, especially preferably 0.1% or less, and most preferably $CeO_2$ is not substantially contained. The term "not substantially contained" used herein means that $CeO_2$ is not contained except for unavoidable impurities, and specifically means that the $CeO_2$ content is 0.01% or less.

In the case where $CeO_2$ is contained, in order to decrease the ultraviolet transmittances, the $CeO_2$ content is preferably 0.03% or more, more preferably 0.05% or more and even more preferably 0.1%6 or more.

In the ultraviolet absorbing glass of the present invention, the $Cr_2O_3$ content is preferably 0 to 0.08%. $Cr_2O_3$ is a component decreasing a visible light transmittance and also a component alleging glass to be tinged with green. When the $Cr_2O_3$ content is 0.08% or less, the visible light transmittance is prevented from being too low. The $Cr_2O_3$ content is more preferably 0.03% or less, more preferably 0.02% or less, more preferably 0.01% or less, more preferably 0.006% or less, more preferably 0.003% or less, even more preferably 0.002% or less and especially preferably 0.001% or less.

In the case where $Cr_2O_3$ is contained, the $Cr_2O_3$ content is preferably 0.0001% or more, more preferably 0.0005% or more, and even more preferably 0.0008% or more.

In the ultraviolet absorbing glass of the present invention, the NiO content is preferably 0 to 0.2%. NiO is a component alleging glass to be tinged with brown. When the NiO content is 0.2% or less, the glass can be prevented from being too brownish. The NiO content is more preferably 0.1% or less, more preferably 0.05% or less, even more preferably 0.02% or less and especially preferably 0.01% or less.

In the case where NiO is contained, the NiO content is preferably 0.003% or more, and more preferably 0.005% or more.

In the ultraviolet absorbing glass of the present invention, the content of $Fe_2O_3$ which is an oxide of trivalent iron is preferably 1 to 3%. $Fe_2O_3$ is a component absorbing ultraviolet rays. $Fe_2O_3$ is also a component alleging glass to be tinged with yellow. When the $Fe_2O_3$ content is 1% or more, ultraviolet transmittances (TUV380 and TUV400) can be made lower. The $Fe_2O_3$ content is more preferably 1.2% or more, even more preferably 1.4% or more, especially preferably 1.6% or more, and most preferably 1.8% or more.

On the other hand, when the $Fe_2O_3$ content is 3% or less, TVA is prevented from being too low. In addition, the glass can be prevented from being too yellowish. The $Fe_2O_3$ content is more preferably 2.5% or less, even more preferably 2.3% or less, especially preferably 2.1% or less, and most preferably 2.0% or less.

In the ultraviolet absorbing glass of the present invention, a mass ratio of divalent iron in terms of $Fe_2O_3$ to total iron in terms of $Fe_2O_3$ (hereinafter the mass ratio being also referred to as Fe-redox) is preferably 10 to 40%. Here, the mass ratio of divalent iron in terms of $Fe_2O_3$ means a ratio obtained in such a manner that FeO which is an oxide of divalent iron is converted in a format of $Fe_2O_3$ and a ratio of the content of the converted FeO to the content of t-$Fe_2O_3$ is obtained. That is, since the molecular weight of FeO is 71.85 g/mol and the molecular weight of $Fe_2O_3$ is 159.7 g/mol, the content of divalent iron in terms of $Fe_2O_3$ can be calculated by multiplying the content of FeO by $((159.7/2)/71.85)$.

When Fe-redox is 10% or more, TE can be reduced. Fe-redox is more preferably 15% or more, and even more preferably 20% or more.

On the other hand, when Fe-redox is 40% or less, TVA can be prevented from being too low. Fe-redox is more preferably 35% or less, more preferably 30% or less, more preferably 27% or less, even more preferably 26% or less, especially preferably 25% or less, and most preferably 24% or less.

In the ultraviolet absorbing glass of the present invention, a product of the content of $Fe_2O_3$ which is an oxide of trivalent iron and the $TiO_2$ content (hereinafter also referred to as $Fe_2O_3 \times TiO_2$) is preferably 2 to 6.

When $Fe_2O_3 \times TiO_2$ is 2 or more, ultraviolet transmittances (TUV380 and TUV400) can be prevented from being too high. $Fe_2O_3 \times TiO_2$ is more preferably 2.3 or more, even more preferably 2.7 or more, especially preferably 3.0 or more, and most preferably 3.5 or more.

On the other hand, when $Fe_2O_3 \times TiO_2$ is 6 or less, TVA can be prevented from being too low. In addition, the glass can be more prevented from being yellowish. $Fe_2O_3 \times TiO_2$ is more preferably 5.2 or less, even more preferably 4.6 or less, especially preferably 4.3 or less, and most preferably 4.0 or less.

In the ultraviolet absorbing glass of the present invention, the total of the content of $Fe_2O_3$ which is an oxide of trivalent iron and the $TiO_2$ content (hereinafter also referred to as $Fe_2O_3 + TiO_2$) is preferably 2.5 to 5.0%. When $Fe_2O_3 + TiO_2$ is 2.5% or more, ultraviolet transmittances (TUV380 and TUV400) can be prevented from being too high. $Fe_2O_3 + TiO_2$ is more preferably 3.0% or more, even more preferably 3.2% or more, and especially preferably 3.4% or more.

On the other hand, when $Fe_2O_3 + TiO_2$ is 5.0% or less, TVA can be prevented from being too low. In addition, the glass can be more prevented from being yellowish. $Fe_2O_3 + TiO_2$ is more preferably 4.6% or less, even more preferably 4.2% or less, especially preferably 3.9% or less, and most preferably 3.7% or less.

In the ultraviolet absorbing glass of the present invention, the content of trivalent iron in terms of $Fe_2O_3$ and the content of $TiO_2$ satisfy the following relation (1).

$$-3.58 \times (Fe_2O_3) - 0.606 \times (TiO_2) \leq -5.0 \qquad \text{relation (1)}$$

When the relation (1) is satisfied, ultraviolet transmittances (TUV380 and TUV400) can be prevented from being too high, and the glass can be more prevented from being yellowish. The left side of the relation (1) is more preferably −6.0 or less, more preferably −7.0 or less, more preferably −8.0 or less, even more preferably −8.5 or less, and especially preferably −9.0 or less.

In the ultraviolet absorbing glass of the present invention, Fe-redox, the content of $t\text{-}Fe_2O_3$ and the content of $TiO_2$ preferably satisfy the following relation (2).

$$1.77 \times \{(1-Fe\text{-}redox/100) \times (t\text{-}Fe_2O_3) + 0.48 \times (TiO_2)\} \geq 3.0 \qquad \text{relation (2)}$$

When the relation (2) is satisfied, ultraviolet transmittances (TUV380 and TUV400) can be decreased easily. The left side of the relation (2) is more preferably 3.5 or more, even more preferably 4.0 or more, especially preferably 4.5 or more, and most preferably 5.0 or more.

In the ultraviolet absorbing glass of the present invention, the total of the CoO content, the Se content and the $Cr_2O_3$ content (hereinafter also referred to as $CoO+Se+Cr_2O_3$) is preferably lower than 0.1%. When $CoO+Se+Cr_2O_3$ is lower than 0.1%, TVA can be prevented from being too low. $CoO+Se+Cr_2O_3$ is more preferably 0.07% or less, and even more preferably 0.05% or less.

In the ultraviolet absorbing glass of the present invention, the value of the following expression (3) represented by the $t\text{-}Fe_2O_3$ content, the $Cr_2O_3$ content, the CoO content and the Se content is preferably 4.0 to 8.0.

$$(t\text{-}Fe_2O_3) + 10 \times (Cr_2O) + 90 \times (CoO) + 1100 \times (Se) \qquad \text{expression (3)}$$

When the value of the expression (3) is 4.0 to 8.0, Pe can be decreased easily, and ultraviolet transmittances (TUV380 and TUV400) can be made lower, so that the color of the glass can be made dark gray. The value of the expression (3) may be 5.0 or more, or 6.0 or more. On the other hand, the value of the expression (3) may be 7.0 or less.

In the ultraviolet absorbing glass of the present invention, the value of the following expression (4) represented by the $TiO_2$ content and the CoO content is preferably 3.0 to 8.0.

$$TiO_2 + 100 \times CoO \qquad \text{expression (4)}$$

When the value of the expression (4) is 3.0 to 8.0, the glass can be tinged with green, and can be prevented from being more yellowish. The value of the expression (4) may be 4.0 or more, 4.5 or more, or 5.0 or more. On the other hand, the value of the expression (4) may be 7.0 or less, 6.0 or less, or 5.5 or less.

In actual production, due to use of a refining agent such as salt cake, $SO_3$ may be contained as a trace thereof in the glass by 0.05 to 0.5% or preferably 0.05 to 0.4%.

The ultraviolet absorbing glass of the present invention may further contain any of oxides of B, Ba, Sr, Li, Zn. Pb. P, Zr, Bi and Sn other than the above-described components. Each content of those oxides may be 0 to 1 mass %. Those components may be contained in total preferably 1% or less, more preferably 0.7% or less, even more preferably 0.4% or less, and especially preferably 0.2% or less.

In addition, any of oxides of Sb and As, Cl and F may be contained. Those can be intentionally mixed from a melting accelerator or a refining agent. Alternatively, those can be contained as impurities in raw materials or cullet. The content of each of those may be 0 to 0.1 mass %.

In addition, any of oxides of Mn, Cu, Mo, Nd and Er may be contained. The content of each of those oxides may be 0 to 0.1 mass %.

It is preferable that each oxide of V and W is not substantially contained. The term "not substantially contained" used herein means that the oxide is not contained except for unavoidable impurities, and specifically means that each content of the oxides is 0.01% or less, preferably 0.005% or less, more preferably 0.003% or less, even more preferably 0.001% or less, and especially preferably 0.0001% or less.

The ultraviolet absorbing glass of the present invention is a glass having the above-described composition and has the following optical properties.

In the ultraviolet absorbing glass of the present invention, TUV400 at a thickness of 3.1 mm (sheet thickness of 3.1 mm) is 2.0% or less. TUV400 is an ultraviolet transmittance measured in a wavelength region of 400 nm or less. TUV400 can evaluate the ultraviolet absorbing performance up to a longer wavelength region than TUV380 measured in a wavelength region of 380 nm or less. When TUV400 is 2.0% or less, for example, sunburn of persons who are inside a vehicle or discoloration of articles inside the vehicle can be prevented in the case where the ultraviolet absorbing glass is used as a glass for the vehicle. TUV400 is preferably 1.5% or less, more preferably 1.2% or less, even more preferably 1.0% or less, and especially preferably 0.5% or less.

In addition, λD at a thickness of 3.1 mm is 555 nm or less. When λD is 555 nm or less, the glass is prevented from being tinged with yellow. λD is preferably 550 nm or less, more preferably 545 nm or less, more preferably 540 nm or less, more preferably 535 nm or less, more preferably 530 nm or less, more preferably 525 nm or less, even more preferably 520 nm or less, and especially preferably 515 nm or less.

On the other hand, λD is preferably 488 nm or more. When λD is 488 nm or more, the glass is prevented from being tinged with blue. λD may be 500 nm or more, or 510 nm or more.

In addition to the above-described optical properties, it is preferable that TVA at a thickness of 3.1 mm is 8% to 25%. When TVA is 8% or more, the outside of the vehicle can be easily visually recognized from the inside of the vehicle. TVA is more preferably 10% or more, even more preferably 12% or more, and especially preferably 14% or more.

On the other hand, when TVA is 25% or less, the privacy inside the vehicle can be protected. TVA is more preferably 24% or less, more preferably 20% or less, even more preferably 18% or less, and especially preferably 16% or less.

A ratio represented by TVA/TUV400 at a thickness of 3.1 mm is 10 or more. When TVA/TUV400 is 10 or more, the visible light transmittance can be prevented from being too low while the ultraviolet transmittance is extremely low. TVA/TUV400 is preferably 11 or more, more preferably 12 or more, even more preferably 13 or more, especially preferably 14 or more, and most preferably 15 or more.

On the other hand, TVA/TUV400 is preferably 30 or less. When TVA/TUV400 is 30 or less, the visible light transmittance can be prevented from being too high, so that the privacy inside the vehicle can be protected. TVA/TUV400 is more preferably 25 or less, even more preferably 20 or less, and especially preferably 18 or less.

TUV380 at a thickness of 3.1 mm is preferably 0.5% or less. When TUV380 is 0.5% or less, for example, sunburn of persons who are inside the vehicle or discoloration of articles inside the vehicle can be prevented. TUV380 is more preferably 0.4% or less, even more preferably 0.3% or less, especially preferably 0.2% or less, and most preferably 0.1% or less.

TE at a thickness of 3.1 mm is preferably 5 to 28%. When TE is 5 to 28%, the temperature inside the vehicle can be prevented from increasing. TE is more preferably 7% or more, even more preferably 10% or more, and especially preferably 11% or more.

On the other hand, TE is more preferably 24% or less, more preferably 20% or less, more preferably 18% or less, more preferably 16% or less, even more preferably 14% or less, and especially preferably 13% or less.

In addition to the above-described optical properties, it is preferable that Pe at a thickness of 3.1 mm is 25% or less. When Pe is 25% or less, the glass has gray color closer to achromatic color. Pe is more preferably 20% or less, more preferably 18% or less, more preferably 15% or less, even more preferably 12% or less, especially preferably 10% or less, and most preferably 8% or less.

In addition, in the ultraviolet absorbing glass of the present invention, it is preferable that a temperature T2 at which viscosity reaches $10^2$ poises is 1440° C. or lower. When T2 is 1440° C. or lower, the glass can be manufactured easily. T2 is preferably 1435° C. or lower, more preferably 1410° C. or lower and especially preferably 1400° C. or lower.

The method for manufacturing the ultraviolet absorbing glass of the present invention is not particularly limited, but, for example, it can be manufactured as follows. Blended raw materials are continuously supplied to a melting furnace and are heated at about 1500° C. to be vitrified. Subsequently, this molten glass is refined and then formed into a glass sheet having a predetermined thickness by a float process or the like. Then, by cutting this glass sheet into a predetermined shape, the ultraviolet absorbing glass of the present invention is manufactured. Thereafter, as necessary, the cut glass can be subjected to a strengthening treatment such as a physical tempering, can be processed into laminated glass or can be processed into insulating glass.

EXAMPLES

The present invention will be specifically explained below along Examples. However, the present invention is not limited to those Examples.

A raw material batch was prepared by using silica sand, feldspar, dolomite, soda ash, salt cake, blast furnace slag, ferric oxide, titanium oxide, cerium oxide, cobalt oxide, sodium selenite, chromium oxide and nickel oxide, as raw materials.

Soda-lime silicate glass containing $SiO_2$: 62 to 70, $Al_2O_3$: 1.8, CaO: 8.4, MgO: 4.6, $Na_2O$: 13.3, $K_2O$: 0.7 and $SO_3$: 0.2 (unit: mass %) as basic components was used. The $SiO_2$ content was adjusted such that the total of the basic components and FeO, $Fe_2O_3$, $TiO_2$, $CeO_2$, CoO, Se, $Cr_2O_3$ and NiO which were added as optical components reached 100 mass %, thereby providing a target composition.

The batch was placed in a crucible made of platinum-rhodium and melted in an electric furnace (in an atmosphere having $O_2$ concentration of about 0.5%). The molten glass was made to flow out on a carbon plate and then annealed in another electric furnace. The obtained glass block was cut into pieces, some of the pieces were polished, and the composition thereof was analyzed by using a fluorescent X-ray analyzer (scanning fluorescent X-ray analyzer ZSX100e manufactured by Rigaku Corporation). A surface of each of others of the pieces was polished into a mirror surface and finished to be 3.1 mm thick, and spectral transmittance was measured with a spectrophotometer.

FeO content (unit: mass %) was obtained by calculation from infrared transmittance at a wavelength of 1000 nm based on the following formula (5). $Fe_2O_3$ content was calculated using the following formula (5) based on total iron oxide content obtained by fluorescent X-ray analysis and the above-described FeO content. Specifically the FeO content was calculated by use of the following formula (5).

$$\text{FeO content(mass \%)}=1.129/t\times\log_{10}(92/T_{1000\ nm}) \quad \text{formula (5)}$$

Here, $T_{1000\ nm}$ designates transmittance (%) of the glass sheet at a wavelength of 1000 nm, and t designates the thickness (mm) of the glass sheet, which is 3.1 here.

In addition, a value A of the left side of the relation (1), a value B of the left side of the relation (2), a value C of the expression (3) and a value D of the expression (4) were obtained.

In addition, visible light transmittance (TVA), energy transmittance (TE), ultraviolet transmittances (TUV380 and TUV400), dominant wavelength (λD) and excitation purity (Pe) were calculated based on the spectral transmittance.

The contents of absorbing components and optical properties of the obtained ultraviolet absorbing glasses are shown in Table 1 and Table 2 below.

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| mass % | FeO | 0.51 | 0.48 | 0.50 | 0.41 | 0.45 | 0.43 | 0.47 | 0.53 | 0.51 |
| mass % | $Fe_2O_3$ | 1.94 | 2.05 | 1.93 | 1.94 | 1.79 | 1.92 | 2.28 | 1.61 | 1.94 |
| mass % | $t\text{-}Fe_2O_3$ | 2.50 | 2.58 | 2.49 | 2.40 | 2.29 | 2.40 | 2.80 | 2.20 | 2.50 |
| mass % | $TiO_2$ | 1.92 | 2.10 | 1.93 | 1.70 | 1.71 | 1.90 | 1.98 | 1.80 | 1.92 |
| mass % | $CeO_2$ | 0 | 0 | 0 | 0.46 | 0.19 | 0.28 | 0.19 | 0 | 0 |
| mass % | CoO | 0.0331 | 0.0350 | 0.0334 | 0.0237 | 0.0243 | 0.0330 | 0.0351 | 0.0204 | 0.0331 |
| mass % | Se | 0 | 0.0003 | 0 | 0 | 0 | 0.0002 | 0.0003 | 0 | 0.0008 |
| mass % | $Cr_2O_3$ | 0.0007 | 0.0008 | 0.0007 | 0.0013 | 0.0007 | 0.0011 | 0.0059 | 0.0007 | 0.0007 |
| mass % | NiO | 0 | 0.0176 | 0.0146 | 0.0071 | 0.0074 | 0.0176 | 0 | 0 | 0 |
| mass % | $CoO + Se + Cr_2O_3$ | 0.0338 | 0.0361 | 0.0341 | 0.0250 | 0.0250 | 0.0343 | 0.0413 | 0.0211 | 0.0346 |
|  | $FeO*TiO_2$ | 0.97 | 1.01 | 0.97 | 0.70 | 0.76 | 0.82 | 0.93 | 0.95 | 0.97 |
|  | $t\text{-}Fe_2O_3/TiO_2$ | 1.30 | 1.23 | 1.29 | 1.41 | 1.34 | 1.26 | 1.41 | 1.22 | 1.30 |
|  | $Fe_2O_3*TiO_2$ | 3.72 | 4.30 | 3.72 | 3.31 | 3.07 | 3.65 | 4.51 | 2.90 | 3.72 |
| mass % | $Fe_2O_3 + TiO_2$ | 3.86 | 4.15 | 3.86 | 3.64 | 3.50 | 3.82 | 4.26 | 3.41 | 3.86 |
| % | Fe-redox | 22.5 | 20.7 | 22.5 | 19.0 | 21.7 | 19.9 | 18.7 | 26.8 | 22.5 |
|  | A | −8.1 | −8.6 | −8.1 | −8.0 | −7.5 | −8.0 | −9.4 | −6.9 | −8.1 |
|  | B | 4.4 | 4.6 | 4.3 | 4.3 | 4.0 | 4.3 | 5.0 | 3.7 | 4.4 |
|  | C | 5.5 | 6.1 | 5.5 | 4.5 | 4.5 | 5.6 | 6.3 | 4.0 | 6.4 |
|  | D | 5.2 | 5.6 | 5.3 | 4.1 | 4.1 | 5.2 | 5.5 | 3.8 | 5.2 |
| % | TVA | 16.3 | 12.0 | 14.7 | 20.3 | 19.8 | 15.2 | 11.2 | 22.5 | 13.6 |
| % | TE | 11.8 | 13.0 | 10.8 | 16.3 | 15.0 | 12.0 | 10.3 | 13.4 | 10.4 |
| % | TUV380 | 0.19 | 0.10 | 0.18 | 0.33 | 0.36 | 0.11 | 0.19 | 0.19 | 0.19 |
| % | TUV400 | 1.12 | 0.80 | 1.04 | 1.38 | 1.79 | 1.20 | 0.62 | 1.50 | 0.82 |
|  | TVA/TUV400 | 14.5 | 15.1 | 14.1 | 14.7 | 11.0 | 12.7 | 18.1 | 15.0 | 16.6 |
| nm | λD | 516.6 | 553.1 | 538.4 | 550.6 | 542.2 | 547.8 | 545.6 | 549.1 | 551.8 |
| % | Pe | 6.8 | 17.3 | 10.3 | 12.3 | 9.9 | 12.2 | 12.4 | 11.6 | 12.1 |

TABLE 2

|  |  | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| mass % | FeO | 0.51 | 0.48 | 0.48 | 0.38 | 0.41 | 0.31 | 0.38 | 0.287 | 0.549 | 0.45 |
| mass % | $Fe_2O_3$ | 2.05 | 2.44 | 2.44 | 1.78 | 2.22 | 1.40 | 1.46 | 1.131 | 1.89 | 1.76 |
| mass % | $t\text{-}Fe_2O_3$ | 2.61 | 2.97 | 2.97 | 2.20 | 2.68 | 1.74 | 1.88 | 1.45 | 2.50 | 2.26 |
| mass % | $TiO_2$ | 2.08 | 1.30 | 2.10 | 1.70 | 1.70 | 1.59 | 2.60 | 1.1 | 1.00 | 1.68 |
| mass % | $CeO_2$ | 0 | 0 | 0 | 0.46 | 0.46 | 0 | 0 | 1.2 | 0 | 0.21 |
| mass % | CoO | 0.0342 | 0.0390 | 0.0390 | 0.0286 | 0.0286 | 0.0325 | 0.0412 | 0.022 | 0.014 | 0.0252 |
| mass % | Se | 0 | 0.0001 | 0.0002 | 0 | 0 | 0.0027 | 0.0003 | 0.0011 | 0 | 0 |
| mass % | $Cr_2O_3$ | 0.0007 | 0.0008 | 0.0008 | 0.0013 | 0.0013 | 0 | 0 | 0 | 0 | 0 |
| mass % | NiO | 0 | 0.0176 | 0.0176 | 0.0071 | 0.0071 | 0 | 0 | 0.01 | 0 | 0.0084 |
| mass % | $CoO + Se + Cr_2O_3$ | 0.0349 | 0.0399 | 0.0400 | 0.0299 | 0.0299 | 0.0352 | 0.0415 | 0.0231 | 0.0140 | 0.0252 |
|  | $FeO*TiO_2$ | 1.05 | 0.62 | 1.01 | 0.65 | 0.70 | 0.49 | 0.99 | 0.32 | 0.55 | 0.76 |
|  | $t\text{-}Fe_2O_3/TiO_2$ | 1.25 | 2.28 | 1.41 | 1.29 | 1.58 | 1.09 | 0.72 | 1.32 | 2.50 | 1.35 |
|  | $Fe_2O_3*TiO_2$ | 4.26 | 3.17 | 5.12 | 3.02 | 3.78 | 2.23 | 3.80 | 1.24 | 1.89 | 2.96 |
| mass % | $Fe_2O_3 + TiO_2$ | 4.13 | 3.74 | 4.54 | 3.48 | 3.92 | 2.99 | 4.06 | 2.23 | 2.89 | 3.44 |
| % | Fe-redox | 22.5 | 18.0 | 18.0 | 19.2 | 17.0 | 19.5 | 22.3 | 22.0 | 24.4 | 22.1 |
|  | A | −8.6 | −9.5 | −10.0 | −7.4 | −9.0 | −6.0 | −6.8 | −4.7 | −7.4 | −7.3 |
|  | B | 4.6 | 4.9 | 5.3 | 4.0 | 4.8 | 3.2 | 3.8 | 2.5 | 3.8 | 3.9 |
|  | C | 5.7 | 6.6 | 6.7 | 4.8 | 5.3 | 7.6 | 5.9 | 4.6 | 3.8 | 4.5 |
|  | D | 5.5 | 5.2 | 6.0 | 4.6 | 4.6 | 4.8 | 6.7 | 3.3 | 2.4 | 4.2 |
| % | TVA | 15.0 | 11.1 | 9.4 | 19.8 | 17.2 | 15.0 | 15.8 | 21.8 | 22.3 | 20.5 |
| % | TE | 11.2 | 13.3 | 10.5 | 17.3 | 15.0 | 17.8 | 15.0 | 19.9 | 11.0 | 14.7 |
| % | TUV380 | 0.19 | 0.10 | 0.10 | 0.33 | 0.33 | 0.64 | 0.40 | 0.36 | 0.10 | 0.40 |
| % | TUV400 | 0.84 | 0.85 | 0.38 | 1.65 | 1.03 | 2.21 | 1.76 | 2.24 | 0.90 | 1.60 |
|  | TVA/TUV400 | 17.8 | 13.0 | 24.8 | 12.0 | 16.7 | 6.8 | 9.0 | 9.7 | 24.7 | 12.8 |
| nm | λD | 528.3 | 535.2 | 554.1 | 511.5 | 548.7 | 572 | 496 | 569.4 | 557.4 | 539.2 |
| % | Pe | 8.1 | 10.8 | 19.6 | 6.1 | 12.4 | 17.0 | 9.8 | 19.3 | 16.6 | 9.3 |

Examples 1 to 14 and 19 are inventive examples, and Examples 15 to 18 are comparative examples. Examples 15 and 16 correspond to Examples 8 and 9 described in Patent Literature 1 (WO2015/088026) respectively, and Examples 17 and 18 correspond to Examples 22 and 7 described in Patent Literature 2 (WO2016/088374) respectively, and the optical properties at a sheet thickness of 3.1 mm were obtained with a reflectance assumed to be 8%.

Although TUV380 in Patent Literature 2 was defined by ISO 9050:1990, it was considered to be same as TUV380 in the present description for the sake of comparison.

Each of the glasses of Examples 1 to 14 and 19 satisfying all the requirements about the glass composition satisfied all the requirements about optical properties at a sheet thickness of 3.1 mm.

In each of the glasses of Examples 15 and 16, $t\text{-}Fe_2O_3/TiO_2$ was lower than 1.2. Therefore, TVA/TUV400 was lower than 10.

In the glass of Example 17, $t\text{-}Fe_2O_3$ was lower than 1.6%. Therefore, TUV400 exceeded 2%.

In the glass of Example 18, the CoO content was lower than 0.016%. Therefore, λD exceeded 555 nm.

Although the present invention has been described in detail and by reference to the specific embodiments, it is apparent to one skilled in the art that various modifications or changes can be made without departing from the spirit and scope of the present invention.

This application is based on Japanese Patent Application No. 2016-248104 filed Dec. 21, 2016, the contents of which are incorporated herein by reference.

The invention claimed is:

1. An ultraviolet absorbing glass comprising, as represented by mass % based on oxides:

| | |
|---|---|
| $SiO_2$ | 62 to 75%; |
| $Al_2O_3$ | 0 to 5%; |
| MgO | 0 to 6%; |
| CaO | 5 to 15%; |
| $Na_2O$ | 10 to 20%; |
| $K_2O$ | 0 to 5%; |
| total iron (t-$Fe_2O_3$) in terms of $Fe_2O_3$ | 1.6% or more; |
| $TiO_2$ | more than 1.0%; and |
| CoO | 0.016% or more, | satisfying a value (t-$Fe_2O_3$/$TiO_2$) obtained by dividing a content of the total iron in terms of $Fe_2O_3$ by a content of $TiO_2$ being 1.2 or more, wherein the ultraviolet absorbing glass further comprises an oxide of Mn, the ultraviolet absorbing glass has, prior to be subjected to a strengthening treatment, an ultraviolet transmittance (TUV400) specified by ISO 13837:2008 convention A at a sheet thickness of 3.1 mm of 2.0% or less, the ultraviolet absorbing glass satisfies, prior to be subjected to a strengthening treatment, a ratio (TVA/TUV400) of a visible light transmittance (TVA) based on a 2-degree field of view using a Standard Illuminant A to the TUV400 at a sheet thickness of 3.1 mm of 10 or more, and the ultraviolet absorbing glass has, prior to be subjected to a strengthening treatment, a dominant wavelength (λD) obtained based on a 2-degree field of view using a Standard Illuminant C at a sheet thickness of 3.1 mm of 555 nm or less.

2. The ultraviolet absorbing glass according to claim 1, wherein a product FeO×$TiO_2$ of a content of FeO and the content of $TiO_2$ is 0.1 or more and less than 1.1.

3. The ultraviolet absorbing glass according to claim 1, comprising, in mass %:

| | |
|---|---|
| FeO | 0.1 to 0.9%; |
| total iron (t-$Fe_2O_3$) in terms of $Fe_2O_3$ | 1.6 to 6%; |
| $TiO_2$ | more than 1.0% and 5% or less; |
| CoO | 0.016 to 0.05%; and |
| Se | 0 to 0.01%. |

4. The ultraviolet absorbing glass according to claim 1, wherein a content of FeO is 0.6% or less.

5. The ultraviolet absorbing glass according to claim 1, comprising 0.1 n as % or less of the oxide of Mn.

6. The ultraviolet absorbing glass according to claim 1, wherein the content of $TiO_2$ is 1.2% or more.

7. The ultraviolet absorbing glass according to claim 1, wherein the content of total iron (t-$Fe_2O_3$) in terms of $Fe_2O_3$ is 1.8% or more, and the content of CoO is 0.018% or more.

8. The ultraviolet absorbing glass according to claim 7, wherein the content of total iron (t-$Fe_2O_3$) in terms of $Fe_2O_3$ is 2.0% or more.

9. The ultraviolet absorbing glass according to claim 7, wherein the content of total iron (t-$Fe_2O_3$) in terms of $Fe_2O_3$ is 2.3% or more.

10. The ultraviolet absorbing glass according to claim 1, wherein a mass ratio of divalent iron in terms of $Fe_2O_3$ to the total iron in terms of $Fe_2O_3$ is 10 to 40%.

11. The ultraviolet absorbing glass according to claim 1, wherein a mass ratio of divalent iron in terms of $Fe_2O_3$ to the total iron in terms of $Fe_2O_3$ is 10 to 25%.

12. The ultraviolet absorbing glass according to claim 1, comprising, as represented by mass % based on oxides:

| | |
|---|---|
| $SiO_2$ | 67 to 70%; |
| $Al_2O_3$ | 1 to 3%; |
| MgO | 3 to 4.6%; |
| CaO | 7 to 11%; |
| $Na_2O$ | 12 to 16%; and |
| $K_2O$ | 0.3 to 3%. |

13. The ultraviolet absorbing glass according to claim 1, wherein a product ($Fe_2O_3$×$TiO_2$) of a content of $Fe_2O_3$ which is an oxide of trivalent iron and the content of $TiO_2$ is 3.0 or more.

14. The ultraviolet absorbing glass according to claim 1, wherein the TVA is 8 to 25%.

15. The ultraviolet absorbing glass according to claim 1, wherein the TVA is 16% or less.

16. The ultraviolet absorbing glass according to claim 1, wherein the TUV400 is 1.0% or less.

17. The ultraviolet absorbing glass according to claim 1, wherein an ultraviolet transmittance (TUV380) of the ultraviolet absorbing glass specified by ISO 9050:2003 at a sheet thickness of 3.1 mm is 0.5% or less.

18. The ultraviolet absorbing glass according to claim 1, wherein an energy transmittance (TE) of the ultraviolet absorbing glass specified by JIS R 3106:1998 at a sheet thickness of 3.1 mm is 28% or less.

19. The ultraviolet absorbing glass according to claim 1, wherein the ultraviolet absorbing glass is physically tempered.

* * * * *